United States Patent [19]

Reinsch

[11] 4,280,796
[45] Jul. 28, 1981

[54] FLASH JET COOLANT CIRCULATION SYSTEM

[76] Inventor: Arnold O. W. Reinsch, 13140 Carousel Ln., Del Mar, Calif. 92014

[21] Appl. No.: 920,986

[22] Filed: Jun. 30, 1978

Related U.S. Application Data

[62] Division of Ser. No. 684,853, May 10, 1976, abandoned.

[51] Int. Cl.³ .......................... B63H 16/00; B63H 1/26
[52] U.S. Cl. ...................................... 417/176; 176/38; 176/65; 417/173
[58] Field of Search .................. 176/38, 37, 50, 60, 176/61, 54–56; 122/33; 417/173

[56] References Cited

U.S. PATENT DOCUMENTS

| | | | |
|---|---|---|---|
| 3,103,917 | 9/1963 | Bauer et al. | 122/33 |
| 3,565,761 | 2/1971 | Hines | 176/56 |
| 3,575,807 | 4/1971 | Ripley | 176/56 |
| 3,625,820 | 12/1971 | Gluntz et al. | 176/54 |
| 4,051,892 | 10/1977 | Reinsch | 176/60 |
| 4,138,318 | 2/1979 | Speelman | 176/61 |

FOREIGN PATENT DOCUMENTS

| | | | |
|---|---|---|---|
| 253151 | 3/1963 | Australia | 176/65 |
| 50-34198 | 6/1975 | Japan | 176/65 |

*Primary Examiner*—Harvey E. Behrend
*Attorney, Agent, or Firm*—Brown & Martin

[57] ABSTRACT

The system removes heat from a vessel containing the source of heat, utilizing heat energy from water circulating through the vessel. The circulating water passes through a subcooler and into a convergent-divergent nozzle of a flash jet pump. Cooled water is drawn into the flash jet pump by the high-velocity flow generated, mixes with the water flashed into steam and condenses it. The mixture flows to the inlet connection of the pressure vessel. A second flash jet pump is utilized to initially fill the vessel with coolant water. Steam in the vessel is condensed in a shock condenser.

1 Claim, 5 Drawing Figures

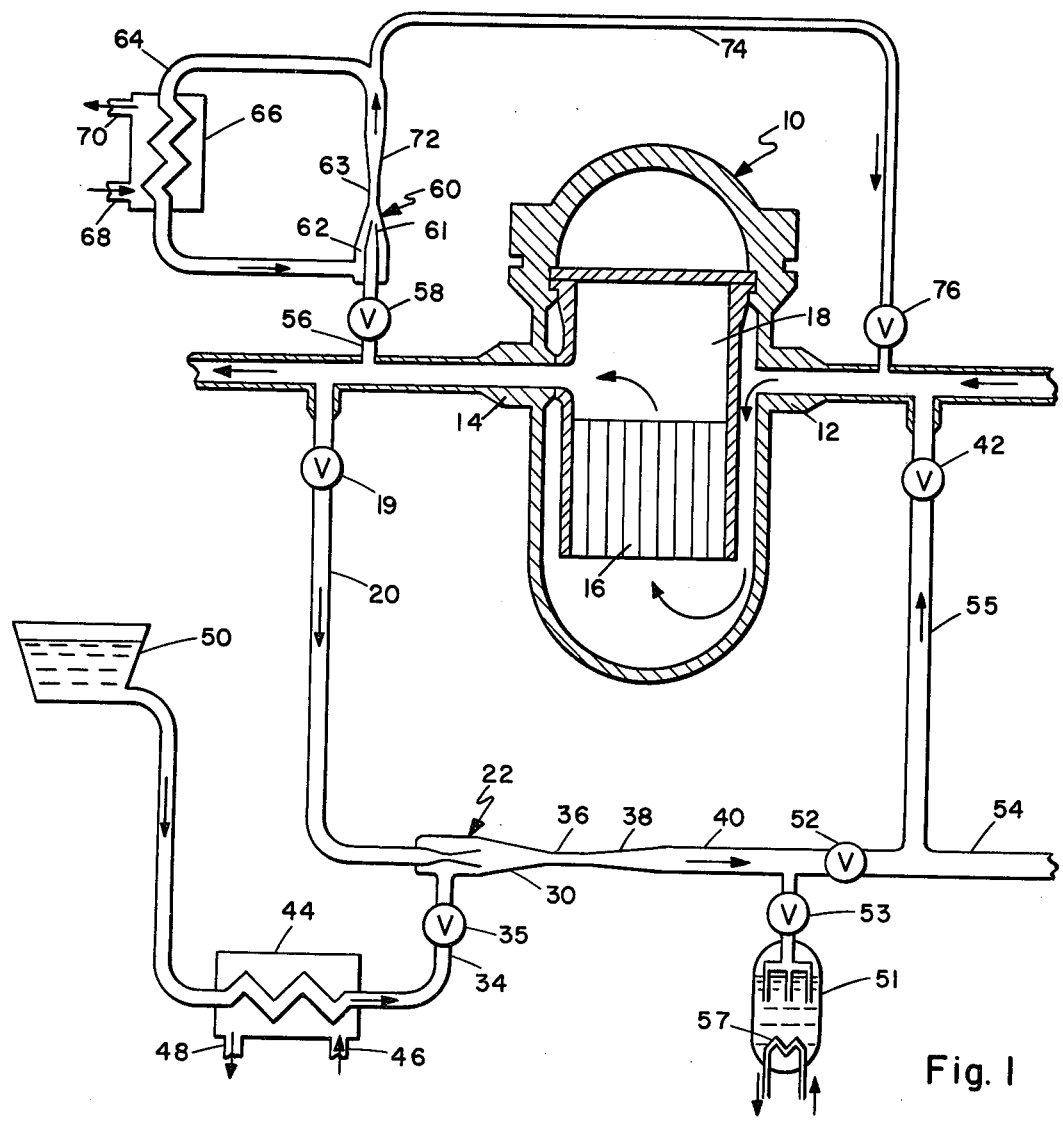
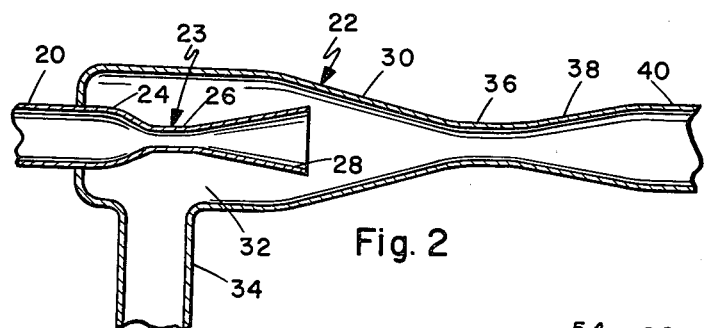
Fig. 1
Fig. 2
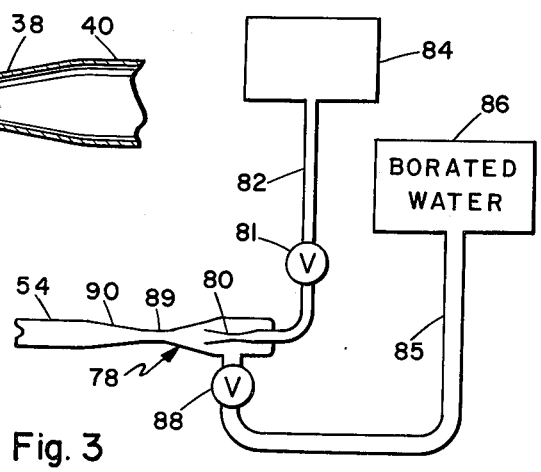
Fig. 3

FLASH JET COOLANT CIRCULATION SYSTEM

This is a division of application Ser. No. 684,853, filed May 10, 1976, now abandoned.

BACKGROUND OF THE INVENTION

Pressurized-water and boiling-water nuclear reactors utilize a vessel to contain the fuel rods with their associated fissinable material. Coolant water is circulated through the vessel and is heated (PWR) or partially vaporized (BWR) by heat transfer from the fission process. The heated coolant is then utilized to heat a secondary coolant through heat exchangers. In the power generation application of nuclear reactors, the vapor powers a steam turbine rotating a generator.

In the event that a malfunction of the system takes place so that the normal coolant circulation is interrupted, the reactor is shutdown by inserting absorber rods into the core, thereby interrupting the nuclear reaction. However, even after shutdown of the reactor, the fission products in the fuel rods continue to produce heat generally referred to as "decay heat". Without the normal coolant flow, this decay heat could melt the fuel rod cladding, the fuel, and the vessel itself, releasing radioactive fission products into the secondary containment building and thereby increasing the risk that radioactive material would be introduced into the atmosphere with the associated potential danger to the public.

The potential loss of radioactive material had led to the development of emergency core-cooling systems. All nuclear reactors must have provision for maintaining sufficiently low temperatures after a malfunction that the integrity of the fuel rods will be insured. The primary malfunction with which the emergency core-cooling systems are concerned is a loss-of-coolant accident. In such an accident, the integrity of the primary coolant system develops a leak or rupture resulting in some of the primary coolant water being lost from the system. When the leak is a relatively minor one, the primary coolant system can continue to function to cool the core after the shutdown so long as the small quantity of coolant being lost is replenished. The replenishment of coolant through a small leak is accomplished by a high pressure injection system. However, in the event of a large rupture developing in the primary coolant system, a different emergency core-cooling system must be brought into play. According to conventional design, such an emergency core-cooling system operates in two distinct phases. Initially pumps are operated to rapidly refill the vessel with coolant water. Subsequently, the new coolant is circulated through the pressure vessel, and the heat added to the circulating coolant is rejected by passing the coolant through a heat removal system. Power for the pumps is obtained from an independent power source such as a Diesel engine. Typically, a complete emergency core-cooling system injects water into each of the primary coolant loops of the reactor so that the break in a single coolant loop will not defeat the operation of the emergency core-cooling systems pumping water into the other primary coolant loops.

It will be apparent that the provision of such systems sufficient to maintain a safe temperature within the vessel is an expensive and critical component of the overall power generating system. Such conventional emergency core-cooling systems are rendered more expensive and less reliable because each of the possible contingencies for such a system's operation adds further to the design capacity requirements. For example, since a Diesel engine requires a finite time to start and begin producing power, a critical time lag exists before the cooling water from the pumps is injected. Water coming into contact with the hot core, it is being partially vaporized by the fuel elements. The steam in the vessel collects in the plenum of the vessel producing a back pressure to the entry of new coolant water. The steam problem, generally referred to as "steam binding", requires that the reactor plant be designed with reduced capacity so that the initial temperature rise caused by the steam binding effect does not endanger the integrity of the reactor core.

Therefore, it is desirable to have a system for removing heat from the vessel that reliably extracts decay heat from the vessel and has a low start up time. Such a system is particularly desirable if it is capable of operating independently of an electrical power source.

SUMMARY OF THE INVENTION

An exemplary embodiment of the invention will be described in association with a pressurized-water reactor. However, it is to be understood that the system has also application in other reactor systems incorporating a circulating coolant and that the system in particular has application to a boiling-water reactor. In the exemplary embodiment, the deficiencies of prior art emergency core-cooling systems are overcome by utilizing the energy in the decay heat from the reactor itself to power the emergency system. The heat energy is utilized by a unique jet pump providing operating characteristics closely corresponding to the requirements for emergency core-cooling over a wide range of failure types. A subcooler for increasing the differential between the saturation temperature and coolant water temperature further enhances the characteristics of the jet pump design. The subcooler and jet pump together are designed to accommodate the coolant in such a manner that the coolant will first flash into steam in the divergent section of the nozzle. Since flashing does not take place in the throat of the nozzle as with conventional designs, the flow does not become choked and the pump produces a high mass flow rate over a wide range of temperature/pressure relationships. Since flashing in the divergent section of the nozzle distinguishes the jet pump according to the invention, the pump is referred to hereinafter as the flash jet pump.

The flash jet pump is further distinguished from conventional designs in its use of an extremely high expansion area ratio. Expansion area ratio refers to the ratio between the size of the nozzle outlet area to the nozzle throat area. For conventional pumps, this ratio is over a maximum range of 1:1 to 8:1. In the flash jet, the area ratio is in the range of 20:1 to 50:1. The high area ratio is brought about as a consequence of the fact that flashing does not take place until the water enters the divergent section.

The two-phase flow exiting the divergent nozzle impinges upon coolant water drawn into the suction side of the flash jet pump. The mixing of the high-velocity two-phase jet with the coolant water produces a combined velocity flow which is converted into pressure rise for pumping. The pressure rise is increased by a divergent section in the conduit so that substantially all of the remaining kinetic energy of the water is converted into pressure for forcing the combined coolant flow into the inlet connection of the vessel. The coolant water is drawn from a supply of additional coolant. The source of supply of the additional coolant is a storage tank or the building sump. The building sump collects the water lost from the primary cooling loop due to the break. Thus, the system becomes self-sustaining with the water being lost from the vessel being picked up by the flash jet pump and recirculated.

For maximum advantage, the subcooler is in the form of a downcomer pipe connected to the outlet connection of the vessel and having a vertical extent of 20 to 40 feet. The effect of the downcomer pipe is to apply a static pressure head on top of the circulating pressure of the coolant thereby raising the saturation temperature and increasing the differential between the saturation temperature and coolant water temperature. The capability of the system for dealing with a wide range of loss-of-coolant accidents and for minimizing fuel rod damage under all circumstances is enhanced by the use of a separate transfer system for reflooding the vessel with an initial charge of coolant water. The operation of such a transfer system assumes that the rupture is sufficiently large that a substantial coolant fraction is lost from the vessel. The transfer system is utilized to transfer boronated water into the vessel in the minimum possible time. The pump for the transfer system incorporates the same principles previously described in association with the recirculation system. That is, the pump is a flash jet pump powered from heat generated by the reactor. Preferably the hot water will be taken from the secondary side of the primary coolant heat exchanger. The heat exchangers contain a substantial quantity of heated water at the moment of a loss-of-coolant accident. Since the transfer system must operate only for an initial period, this finite quantity of heated water is sufficient to the purpose. A subcooler is connected to the flash jet. The subcooler is a downcomer pipe having a vertical elevation difference of approximately 40 feet. Cold water is drawn from a storage tank containing boronated water by the flash jet pump and passed into the inlet connection of the vessel.

A third sub system of the invention provides an additional enhancement of the operating characteristics and response time. The steam binding problem referred to previously is alleviated by a condenser that operates to condense steam generated in the vessel so that water from the transfer system reaches the fuel rods more rapidly. The condenser incorporates a unique design whereby a relatively simple condenser structure with no moving parts and able to withstand the full system pressure rapidly condenses any steam generated. After condensation, the heat is removed by a heat exchanger so that the condensate may be then returned to the condenser and utilized as cooling water. The condenser is powered by a conventional jet pump operating off the generated steam. Thus, whenever sufficient steam is present to require removal, there is sufficient energy available for powering the condenser. A circulating flow through the heat exchanger is utilized so that the jet pump produces a combined flow of steam and the cooled water from the heat exchanger which then passes into a mixing tube. In the mixing tube, the pressure of the combined flow rises so that the steam in the combined flow at a point along the mixing tube condenses. The condensation is substantially instantaneous and produces a shock front in the mixing tube. The shock front produced is a primary characteristic of the system and therefore, the condenser is referred to as a shock condenser. A diffuser further increases the pressure to promote circulation through the heat exchanger.

It is therefore an object of the invention to provide a new and improved flash jet coolant circulation system.

It is another object of the invention to provide a new and improved flash jet coolant circulation system that has few moving parts.

It is another object of the invention to provide a new and improved flash jet coolant circulation system with a highly reliable cooling action.

It is another object of the invention to provide a new and improved flash jet coolant circulation system which operates over a wide pressure range.

It is another object of the invention to provide a new and improved flash jet coolant circulation system that reliably transfers an initial charge of water into a reactor vessel.

It is another object of the invention to provide a new and improved flash jet coolant circulation system that reduces the tendency for steam produced within the reactor vessel to slow the refilling process.

Other objects and many attendant advantages of the invention will become more apparent upon a reading of the following detailed description together with the drawings in which like reference numerals refer to like parts throughout and in which:

BRIEF DESCRIPTION OF THE DRAWINGS

FIG. 1 is a diagramatic representation of the system including the flash jet circulation system and shock condenser.

FIG. 2 is a sectional view of the flash jet nozzle.

FIG. 3 is a schematic representation of the injection system.

DETAILED DESCRIPTION OF THE DRAWINGS

Figure 4:
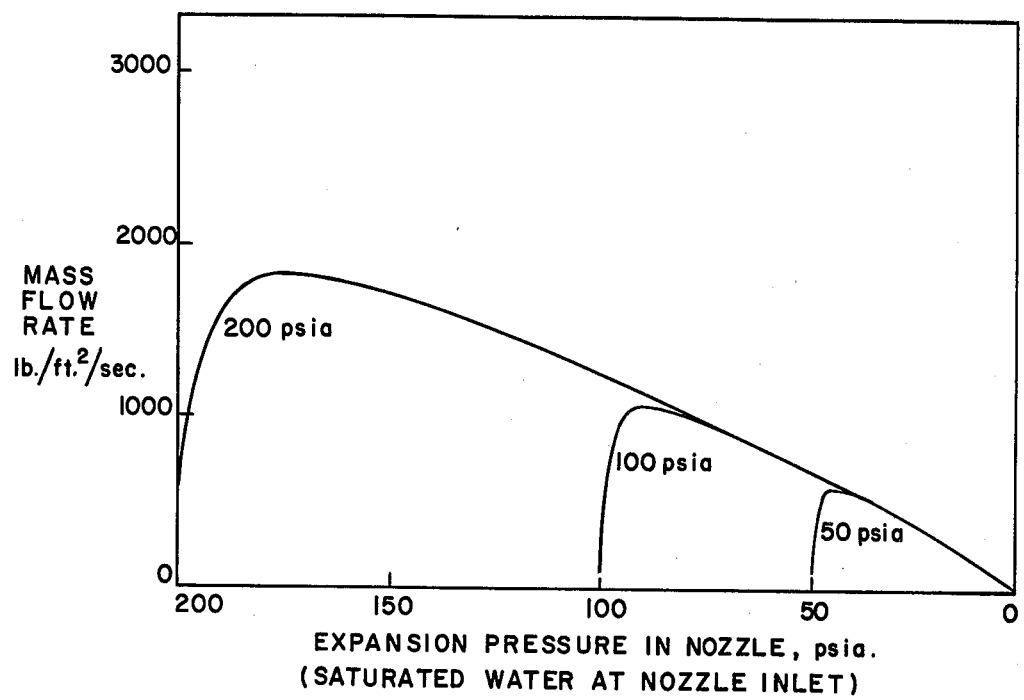
FIG. 4 and FIG. 5 are diagrams showing the mass flow rate versus expansion pressure without and with subcooling respectively.

Referring now to the drawings, there is illustrated a reactor vessel 10 with inlet connection 12 and outlet connection 14. A single cooling loop is illustrated. However, it is to be understood that in the typical case the reactor vessel would have three or more coolant loops. The system of the invention to be described hereinafter could be applied to one or all of the additional coolant loops.

The vessel houses a reactor core 16 incorporating the fuel rods and associated structure. In normal operation, coolant water enters via the inlet connection 12, passes down along the reactor core 16 and then up through the reactor core into a plenum 18 to exit the vessel 10 through the outlet connection 14. For operation of the system according to the invention, the valve 19 is opened to permit the coolant water that has been heated by being passed through the reactor core 16 to enter the downcomer pipe 20. As noted, the downcomer pipe functions as a subcooler by the hydrostatic pressure developed through the vertical extent of the downcomer pipe and increases the difference between the saturation temperature and the temperature of the coolant. The subcooling effect is obtained without loss of coolant temperature or heat loss. However, it should be noted that the subcooling could be obtained by the injection of cool water from a separate cold-water source or could be obtained by a heat exchanger. The output of the subcooler is connected to the flash jet pump 22.

The flash jet pump 22 is shown in FIG. 2 to comprise a nozzle 23 incorporating a convergent section 24, throat 26 and divergent section 28. The entire nozzle 23 is contained within a housing 30 producing an annulus 32 surrounding the nozzle 23. Coolant to replace the coolant loss by a rupture in the primary cooling circuit is drawn through the conduit 34. One source for the make-up coolant is the building sump 50 which collects the coolant lost from the primary cooling system. The coolant passing through the reactor core takes on the heat being developed by the decay heat of the reactor core. A heat exchanger 44 removes heat from the make-up coolant to maintain a system equilibrium. Secondary coolant water for this purpose is available in the event of an emergency. The secondary coolant water passes into the heat exchanger from connection 46 and is drawn off from the heat exchanger at connection 48. A valve 35 in the make-up coolant conduit 34 prevents water from the sump 50 from entering the jet pump 22 and subcooler 20 before the jet pump commences operation. The combined flow of the make-up coolant and the two-phase flow from the flash jet nozzle 23 pass from the housing into a high-velocity flow section 36 and then into a diffuser section 38. The high-velocity section and diffuser section 38 convert the kinetic energy from the high-velocity flow into static pressure in conduit 40 thereby pumping the flow against the hydrostatic pressure head through an open valve 52 and through the inlet connection 12 into the vessel 10.

Flash jet pump 22 has a nozzle area ratio (the ratio of the nozzle outlet area to the nozzle throat area) in the range of 20:1 to 50:1. Flashing of hot water in the divergent nozzle section produces a supersonic outlet velocity. Thus, the thermal energy of the hot water is converted into kinetic energy. The combination of the subcooler 20 and the convergent nozzle section result in incompressible flow in the convergent section 24 and throat 26 converting into compressible flow in the divergent nozzle section 28. The subcooler 20 interaction with the nozzle 23 results in a steady outlet pressure that is essentially proportional to the inlet pressure. This is an important stabilizing effect in conjunction with the flow rate stabilization that is described more fully hereinafter.

A start-up tank 51 is utilized to maintain a sub system pressure in the leg of the system incorporating the jet pump 22. A reduced pressure is a prerequisite to the operation of the jet pump 22. Reduced pressure is required to cause flashing of the hot water in the divergent section of the nozzle. After start-up, the high-velocity flow and condensation produces a self-sustaining low pressure generation for both the pump operation and for the suction of the make-up coolant through conduit 34. The reduced pressure is produced in the start-up tank 51 by collecting by gravity in the tank 51 all the water in the subcooler pipe 20, jet pump 22 and conduit 40 and then cooling the water by cold water flow through the coil 57. Cooling of the water causes a partial condensation of water vapor in the leg thereby reducing the total pressure in the leg. After the system is operational, the valve 53 may be closed.

It will be noted that after the initial loss of coolant, steam formed by contact with the injected coolant and the reactor core 16 will form in the reactor core and collect in the reactor plenum 18. The back pressure caused by this steam will slow the entry of water into the reactor core. The steam so generated is drawn off by conduit 56 through a valve 58 and into a jet pump 60. Thus, the steam is utilized to power the jet pump 60 and circulate coolant through the conduit 64 and heat exchanger 66. Coolant from the heat exchanger 66 is drawn into the annulus 62 surrounding the jet pump nozzle 61, resulting in a combined high-velocity flow through the high-velocity section 63. In section 63, a condensation shock takes place. Thus, all of the fluid in the conduit 64 is in the form of water and passes through divergent section 72. Heat is rejected by the heat exchanger 66 which extracts sufficient heat from the coolant so that it can be utilized as coolant on the suction side 62 of the shock condenser jet pump 60. Secondary coolant water is passed into the heat exchanger 66 on connection 68 and drawn from the heat exchanger on connection 70. The condensed coolant produced in the shock condenser is delivered in conduit 74 through valve 76 into the inlet connection 12 thereby returned as water to the vessel 10.

The initial charge of coolant into the reactor vessel after a loss of coolant accident is provided from a storage tank 86 containing a quantity of boronated water, as in FIG. 3. Motive power for the pumping action is provided by a flash jet pump 78 which is essentially similar in its structural particulars to the flash jet pump 22 with exceptions set forth hereinafter. Hot water to power flash jet pump 78 is provided from the secondary side of the heat exchanger 84 through a subcooler in the form of downcomer pipe 82. The subcooled water passes through a valve 81 into the convergent-divergent nozzle 80 producing a high velocity flow that draws the boronated water through the conduit 85 and valve 88. The resulting combined flow enters a high-velocity section 89 and passes into the diffuser section 90. An increase in the pressure of the resultant flow is produced which is sufficient to force the boronated water through conduit 54 and up the conduit 55 through valve 42 and into the inlet connection 12. The flash jet pump 78 operates from heated water on the secondary side of the heat exchanger which is always available subsequent to normal operation of the nuclear reactor. The immediate start-up of the flash jet pump 78 is obtained by opening the valves 81, 88 and 42. No other moving parts or additional valves are essential to the operation. The operation of the transfer system is enhanced by the operation of the shock condenser system because any steam formed during the initial penetration of the boronated water into the core 16 will be drawn off and condensed by the shock condenser system thereby eliminating the back pressure in allowing the reflooding to take place in a minimum time.

Because of the higher pressure of the hot water utilized, a subcooler with a larger vertical elevation difference on the order of 40–60 feet is required. The area ratio of the flash jet pump 78 in this application is in the range of 30:1 to 70:1. Since the pressure in the secondary side of the heat exchanger will not vary as much as the potential for pressure variation in case of the vessel, it may be possible to eliminate the subcooler in some applications.

Figure 5:
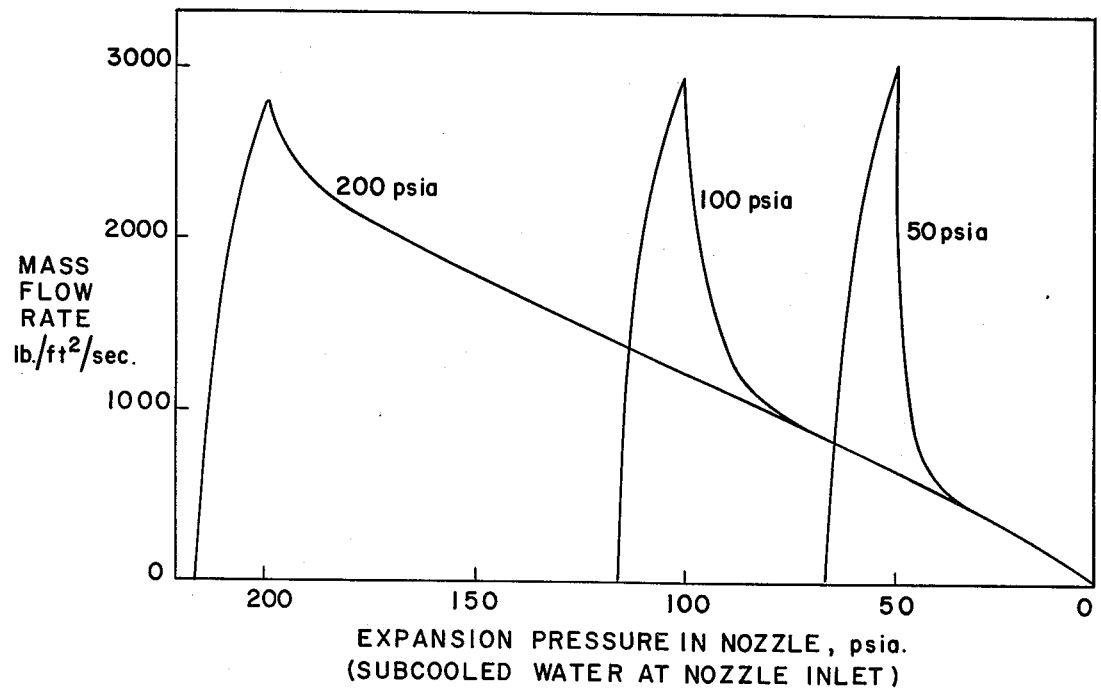

Referring particularly to FIGS. 4 and 5, the contrast between choked flow and flow in the flash jet are illustrated. FIG. 4 illustrates the effect of interpressure on a jet pump with no subcooling. The maximum mass flow rate for an inlet pressure of 200 p.s.i.a. is substantially three times that for an inlet pressure of 50 p.s.i.a. It will be apparent that with such a system, the design criterion would be strongly dependent upon the minimum pressure at which the system must operate and the system would have excess capacity at all other pressures. As previously noted, the expansion pressure is proportional to the inlet pressure.

Referring now to FIG. 5, there is illustrated the mass flow rate versus expansion pressure relationship for the subcooled case. It will be seen that the maximum flow rate is now not strongly dependent on inlet pressure. In fact, there is a slight increase within the maximum flow rate with a reduction in the inlet pressure. For a given nozzle design, the expansion pressure is independent of the inlet pressure. Thus, a highly stable relationship exists and a dependable high flow rate will be produced substantially independent of the system pressure over a wide range.

Having described my invention, I now claim:

1. A system using the energy of heated water for pumping water into a vessel, the vessel having a water coolant inlet connection, the system comprising: in combination flash jet pump means having a nozzle with converging and diverging sections connected to a source of heated water for flashing a portion of the water from said source of heated water into steam, said flashing taking place at least in said divergent section of said nozzle, and producing a high velocity two-phase flow, a source of relatively cool water connected to said flash jet pump means for being drawn into said two-phase flow downstream of said divergent section of said nozzle, the output of said flash jet pump being connected to the vessel, steam jet pump means having a coolant inlet and having steam inlet which is connected to the vessel for utilizing any steam in the vessel to circulate coolant in a circulation loop, condenser means comprising a mixing tube in which condensation shock occurs to produce condensed coolant downstream of said jet pump, heat rejection means for extracting heat from at least a portion of said condensed coolant and returning at least a portion of said condensed coolant, from which heat has been extracted, to said coolant inlet of said steam jet pump, said steam jet pump means enhancing the operation of said flash jet pump means.

* * * * *